United States Patent [19]
Suttner

[11] 3,900,196
[45] Aug. 19, 1975

[54] SOUND EFFECT TOY GAME COMBINATION

[76] Inventor: Thomas John Suttner, 1605 28th Ave. E., Palmetto, Fla. 33561

[22] Filed: May 29, 1974

[21] Appl. No.: 474,201

[52] U.S. Cl.................... 273/1 R; 35/8 A; 35/8 R
[51] Int. Cl.². ............................................ A63F 9/00
[58] Field of Search ....... 273/1 R, 1 E, 1 M; 35/8 A

[56] References Cited
UNITED STATES PATENTS
| | | | |
|---|---|---|---|
| 2,123,258 | 7/1938 | Ranger | 35/8 A UX |
| 2,416,353 | 2/1947 | Shipman et al. | 35/8 A UX |
| 3,280,271 | 10/1966 | Meyer | 35/8 A UX |

*Primary Examiner*—Paul E. Shapiro
*Attorney, Agent, or Firm*—Sherman Ley

[57] ABSTRACT

A method and means for taping are provided for producing a plurality of life-like every day sounds to make up stories or adventures in a life-like manner, similar to oldtime radio stories. Pre-recorded records with blank spots or lulls are provided to derive exitement and adventure by using one's own personal voice. Educational purposes are also derived from a kit by creating different sound effects.

1 Claim, 11 Drawing Figures

PATENTED AUG 19 1975

3,900,196

3,900,196

SOUND EFFECT TOY GAME COMBINATION

BACKGROUND OF THE INVENTION

1. Field of the Invention

The present invention relates to sound effects, and more particularly to a method and means for producing sound effects to be recorded on a casette, tape or the like.

2. Summary of the Invention

A method and means are provided for easily and conveniently producing sound effects that will resemble various situations that occur in everyday life, and wherein these sound effects can be conveniently recorded on a casette, tape or the like. The parts for producing the sound effects are adapted to be supplied in kit form so that they can be merchandized conveniently to be sold to various consumers or purchasers.

The primary object of the present invention is to provide a method of and means for producing sounds of different types so that such sounds can be recorded on various members such as casettes, tapes and the like.

Still another object of the present invention is to provide a sound effect toy game combination that is simple and inexpensive to manufacture and which is durable in form and efficient to use.

Other objects and advantages will become apparent in the following specification when considered in the light of the attached drawings.

DESCRIPTION OF THE PREFERRED EMBODIMENT

Figure 1:
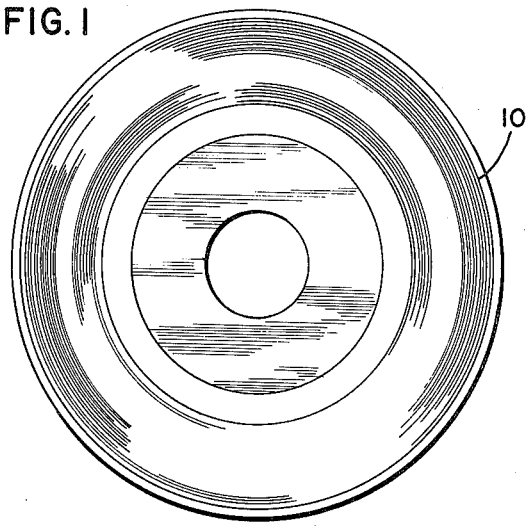
FIG. 1 is a plan view of a record for the sound effect.

Referring now to the drawings in detail, wherein like reference characters indicate like parts throughout the several figures, the numeral 10 indicates a record that can be used with other items for making up one's own stories. The record 10 shown in FIG. 1 may have different sounds thereon.

Figure 2:
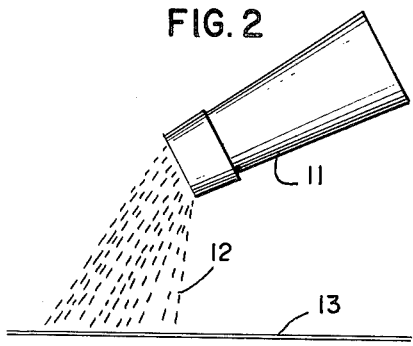
FIG. 2 is an elevational view illustrating a salt shaker being used to dispense grains of sand and the like onto a sheet material to produce certain kinds of sound effects that can be recorded on a member such as a tape or casette.

For example, in FIG. 2, a salt shaker 11 can be tilted to dispense the salt or grains of sand 12 onto a sheet 13 to produce certain sound effects that can be recorded on the tape or cassette.

Figure 3:
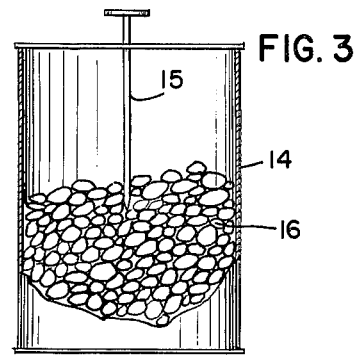
FIG. 3 is an elevational view, with parts broken away, illustrating a can or container having a nail extended therethrough, and with the can having a plurality of small pebbles or rocks therein for use in producing sounds to be recorded.

In FIG. 3 there is illustrated a portion of a can or container 14 that has a nail 15 extended therein, and the can 14 has a plurality of pebbles or elements 16 therein.

Figure 4:
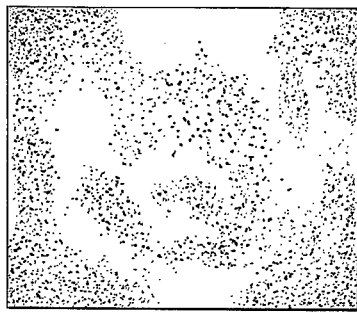
FIG. 4 is a plan view of a strip of sand paper.
Figure 5:
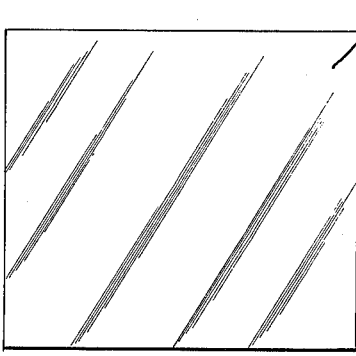
FIG. 5 is a plan view of a piece of glass.
Figure 6:
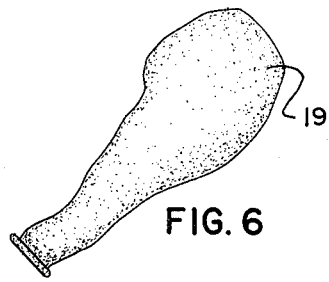
FIG. 6 is an elevational view of a balloon to be used in making certain sounds.
Figure 7:
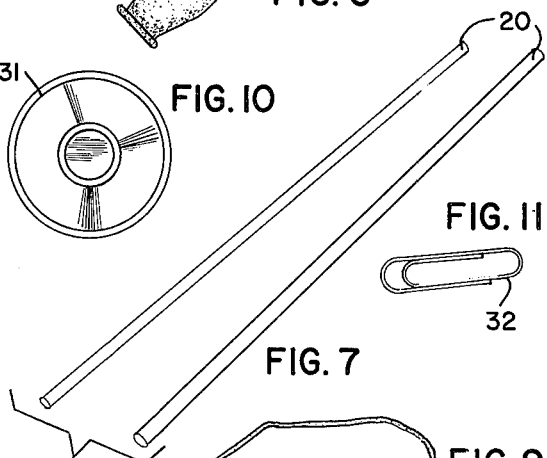
FIG. 7 is a perspective view of straws to be used in making sounds.

FIG. 4 illustrates a sheet of sand paper indicated by the numeral 17, and FIG. 5 illustrates a piece of glass indicated by the numeral 18. In FIG. 6 there is shown a balloon 19, while FIG. 7 shows a plurality of straws 20.

Figure 8:
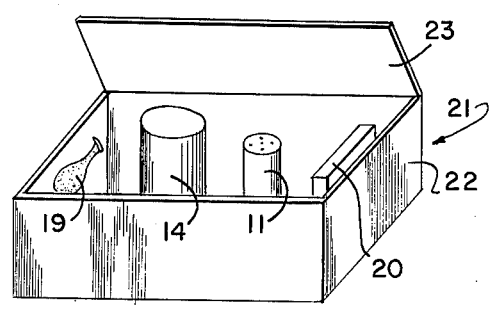
FIG. 8 is a perspective view of a kit that can be used for holding a plurality of the objects that are to be used for producing the various sounds.

Referring to FIG. 8, there is shown a box or container that is indicated by the numeral 21, and the container or box 21 includes a receptable portion 22 that has a lid or cover 23 suitably hingedly connected thereto. The unit 21 of FIG. 8 can be merchandized or sold as a kit for holding the various elements such as those shown in FIGS. 2–7 so that the items can be conveniently merchandized or packaged for sale in a store or the like. Instead of using the box 21, a transparent bag or other member may be utilized.

From the foregoing, it will be seen that there has been provided a method of and means for producing realistic life-like sounds that can be conveniently recorded on a member such as a tape. For example, as shown in FIG. 2, the shaker 11 can be turned upside down to dispense the material 12 onto the sheet 13. By playing the record 10 on a suitable record player or other member, in conjunction with sounds recorded on a tape, different effects can be provided. Similarly, the pebbles 16 and the container 14 can be shaken or rattled in conjuction with the nail 15 to provide a different type of sound effect. A nail can be drawn across the sand paper 17 or across the piece of glass 18 to produce different sound effects that can be recorded. The balloon 19 can be inflated with air and then be permitted to have the air discharged to produce other sound effects. The straws 20 can be used for also producing various types of desired sound effects. When the parts are not being used, they can be stored conveniently in the box or container 21.

The parts can be made of any suitable material and in different shapes or sizes as desired or required.

The present invention can be used for producing different types of sound effects and, for example, it can be used for imitating old-time radio using a person's own voice so that a person can see how he or she sounds as an announcer to improve one's voice. The kit is educational and also provides amusement and permits different sound effects to be made by an individual. Various realistic scripts can be included with spots using one's own voice or the voices of others so that, for example, death defying situations can be simulated on 45 rpm records and the like. The kit permits a person to use his or her imagination with realistic sounds that ordinarily can not be imitated through mechanical means. For example, sound effects can be produced to simulate a visit to a haunted house, the flying of a bomber airplane attempting to bomb an enemy ship with lots of action, the sound of racing cars can be created, the sound of army fighters involved in a dog fight with lots of action as well as other military or civilian sounds.

The kit may include sufficient products to make fifty or more different sound effects. An instruction sheet is adapted to be provided with the kit explaining the use of the products. The story with blank spots will be on records. Additional sound effects or sounds of a person's voice can be added to the blank spaces or the like so that when the member is played back it will consist of a combination of the prerecorded sounds as well as the added sound effects. Sound effects similating horns for buses, automobiles, motor cycles, boats and the like. Also sound effects resembling fires, storms, and the like can be provided. To produce a sound resembling a squeaking door, a nail can be scraped over a piece of glass such as the glass 18. To produce a sound resembling a motor boat motor or a lawn mower engine, an end of the balloon 19 can be cut off and a person can blow through the balloon to produce this effect. To produce a thunder effect, the balloon can be filled with small rocks and the like. To simulate lighting a cigarette, one drops a tooth pick across sandpaper. Pieces of sand paper can be rubbed together to resemble the sawing of wood. Cellophane can be squeezed or cracked to resemble the sound of a walk through bushes. The balloon can be filled with rocks and moved to resemble thunder, and pieces of sandpaper can be rubbed together rhythmically to resemble the sound of a train. The straws 20 can be used to simulate the sound of a train releasing steam. A novelty bird whistle can be included. The straws 20 can also be used to blow through while the other end is submerged in water to simulate a babbling brook or stream. To simulate the sound of rain, the small metal can 14 can be half filled with rocks 16 and the nail 15 is pushed through the lid into the rocks so that by twisting it in a circular motion, the sound of rain will be produced. To produce the sound of screeching of brakes, the point of a nail can be dragged across a piece of glass 18. Other items that can be included may be toothpicks, horns, and the like.

Instructions can be provided for making simulated sounds such as fire, fights, eating of food, footsteps, a hissing sound, horses' hoofs, explosions, marching feet, the opening of a door with a key, chopping of wood, sounds similar to those produced by animals, bells and chimes, birds' wings, crashing of buildings, and rattling of bones. Other sounds can be produced to resemble a police patrol.

The record 10 may have pre-recorded stories thereon with blank spots or lulls having no sounds so that a user can put his or her voice on blank spaces to provide a complete story to be subsequently taped and then played back. A person can record his own voice on the blank spaces on the record 10. Suitable instructions are adapted to be provided so that the user can be guided on what to say and when to say it. The child or other user can use his or her own phraseology. Also, the device can be placed in institutions of learning for use in helping to learn different ideas such as dancing or to help motivate a person to do desirable things. An instruction book is included with the kit.

Figure 10:
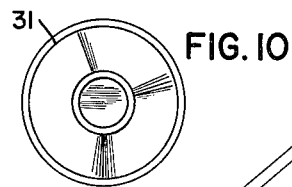
FIGS. 9, 10 and 11 illustrate a rubber band, pie pan, and paper clip for use in producing certain sound effects.
Figure 11:
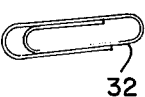
Figure 9:
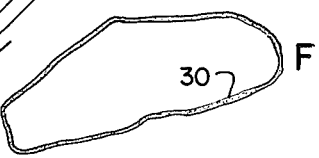

In FIG. 9 the numeral 30 indicates a rubber band, and in FIG. 10 the numeral 31 indicates a pie pan. In FIG. 11 the numeral 32 indicates a paper clip.

Various items can be provided in kit form for making sounds, and wherein the materials may consist of household items so that sounds can be made to resemble a great many different sound effects such as rain, thunder, vehicles, airplanes, explosions, musical instruments, fire, police, traffic conditions, eating and drinking, lightening, water flowing in streams, cooking of food and the like.

With material supplied in kit along with household items, a plurality of desired sound effects can be produced, but will not be put on phonograph records but will only put on tape or cassette.

The material in kit form for making the sound effects may consist of an aluminum pie pan such as the pie pan 31 of FIG. 10, different sizes of balloons, nails of different sizes, pieces of aluminum, pieces of glass, sandpaper, cellophane, whistles, paper clips, rubber bands, envelopes, bags of sand, plastic straws and the like. 33, 45 and 78 rpm records may be included with the material. Exciting stories can be provided, and blank spaces or lulls are provided so that a person using the unit can put his or her voice at a given time to transfer the story from the record to the tape. Signals may be provided to let the person know when to speak. Stories such as the following can be utilized: flying an airplane, visiting a haunted house, sounds of police vehicles and the like.

It will be seen that pre-recorded records of stories or adventures can be provided having blank spaces therein for the sound of the person or persons' voices to fill the spaces to be taped on a recorder so as to make the adventure life-like.

A plurality of records are adapted to be included in the package, and one side of these records may have sound effects thereon that ordinarily can not be made by using the household or mechanical pieces. The sound effects are arranged so that a person can make up his own story.

Additional embodiments of the invention in this specification will occur to others and, therefore, it is intended that the scope of the invention be limited only by the appended claims and not by the embodiments described hereinabove. Accordingly, reference should be made to the following claims in determining the full scope of the invention.

What is claimed is:

1. In a sound effect toy game combination, a recording unit, means for permitting a person to make various sounds, means for super-imposing the sounds produced on the recording unit, and wherein the sounds that are produced are realistic and life-like, said means comprising a salt shaker having grains of material therein, a can having small elements positioned therein, a strip of sand paper, a piece of glass, a balloon and straws; a pre-recorded record having blank spaces therein, and a record player for reproducing the sounds on the record.

* * * * *